US011755128B2

(12) United States Patent
Lehmann et al.

(10) Patent No.: US 11,755,128 B2
(45) Date of Patent: Sep. 12, 2023

(54) STYLUS WITH COMPRESSIVE FORCE SENSOR

(71) Applicant: Apple Inc., Cupertino, CA (US)

(72) Inventors: Alex J. Lehmann, Redwood City, CA (US); Qiliang Xu, Alamo, CA (US); Blake R. Marshall, San Jose, CA (US); Nathaniel M. Parnell, San Francisco, CA (US); Wesley W. Zuber, Mountain View, CA (US); Henry N. Tsao, Woodside, CA (US); Xiaofan Niu, San Jose, CA (US); Pavan Gupta, Belmont, CA (US); Nahid Harjee, Sunnyvale, CA (US); Paul X. Wang, Cupertino, CA (US); Brenton A. Baugh, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/461,711

(22) Filed: Aug. 30, 2021

(65) Prior Publication Data
US 2022/0100290 A1   Mar. 31, 2022

Related U.S. Application Data

(60) Provisional application No. 63/083,786, filed on Sep. 25, 2020.

(51) Int. Cl.
*G06F 3/0354* (2013.01)
*G06F 3/044* (2006.01)

(52) U.S. Cl.
CPC ........ *G06F 3/03545* (2013.01); *G06F 3/0442* (2019.05)

(58) Field of Classification Search
CPC ................. G06F 3/038; G06F 3/03545; G06F 2203/0384; G06F 3/0383; G06F 3/0346; G06F 3/03543; G06F 3/017; G06F 3/04883; G06F 3/016; G06F 3/041; G06F 3/011; G06F 3/0442
See application file for complete search history.

(56) References Cited

U.S. PATENT DOCUMENTS

| | | | | |
|---|---|---|---|---|
| 7,523,672 | B2 * | 4/2009 | Lapstun | B43K 29/08 |
| | | | | 73/818 |
| 9,035,743 | B2 | 5/2015 | Omar et al. | |
| 9,442,578 | B2 * | 9/2016 | Oh | G06F 3/03545 |
| 9,671,877 | B2 * | 6/2017 | Zerayohannes | G06F 3/03545 |
| 9,727,161 | B2 | 8/2017 | Hinckley | |
| 9,946,365 | B2 | 4/2018 | Cueto | |
| 10,105,983 | B2 * | 10/2018 | Steele | B43K 29/00 |
| 10,168,804 | B2 | 1/2019 | Zimmerman et al. | |
| 10,180,731 | B2 * | 1/2019 | Clambaneva | G06F 3/01 |
| 10,496,193 | B1 * | 12/2019 | Alfano | G06F 3/044 |

(Continued)

FOREIGN PATENT DOCUMENTS

JP   2010238046   * 10/2010 ............. G06F 3/033

*Primary Examiner* — Olga V Merkoulova
(74) *Attorney, Agent, or Firm* — BAKERHOSTETLER

(57) ABSTRACT

A stylus input device can allow a user to interface with an external electronic device. The stylus can provide an additional or alternative input to the external electronic device in response to a user applying a compressive force to the device housing. The stylus can include multiple sensors to provide a signal in response to the compressive force applied to the stylus.

13 Claims, 9 Drawing Sheets

(56) References Cited

U.S. PATENT DOCUMENTS

| | | | |
|---|---|---|---|
| 10,564,724 B1 | 2/2020 | Bergeron et al. | |
| 10,922,870 B2* | 2/2021 | Vaganov | G06T 15/02 |
| 11,036,315 B2* | 6/2021 | Usui | G06F 3/0383 |
| 2003/0163287 A1* | 8/2003 | Vock | A61B 5/681 |
| | | | 702/187 |
| 2005/0036336 A1* | 2/2005 | Yang | G06F 3/03542 |
| | | | 362/579 |
| 2007/0042620 A1* | 2/2007 | Lapstun | G06F 3/0321 |
| | | | 439/157 |
| 2010/0155579 A1* | 6/2010 | Torres-Jara | G01L 5/169 |
| | | | 250/221 |
| 2014/0035884 A1* | 2/2014 | Oh | G06F 3/03545 |
| | | | 345/179 |
| 2014/0253469 A1* | 9/2014 | Hicks | G06F 3/03545 |
| | | | 345/173 |
| 2014/0253522 A1* | 9/2014 | Cueto | G06F 3/0383 |
| | | | 345/179 |
| 2015/0212578 A1 | 7/2015 | Lor et al. | |
| 2016/0139690 A1 | 5/2016 | Chang | |
| 2016/0179222 A1* | 6/2016 | Chang | G06F 3/03545 |
| | | | 345/179 |
| 2016/0282970 A1* | 9/2016 | Evreinov | G06F 3/0383 |
| 2016/0303891 A1* | 10/2016 | Steele | B43K 25/022 |
| 2017/0052610 A1* | 2/2017 | Large | G06F 3/0485 |
| 2017/0185165 A1* | 6/2017 | Clambaneva | G06F 3/01 |
| 2019/0255252 A1* | 8/2019 | Gentz | A61M 5/315 |
| 2020/0026327 A1* | 1/2020 | Hendren | G06F 1/1643 |
| 2020/0285328 A1* | 9/2020 | Usui | G06F 3/038 |

\* cited by examiner

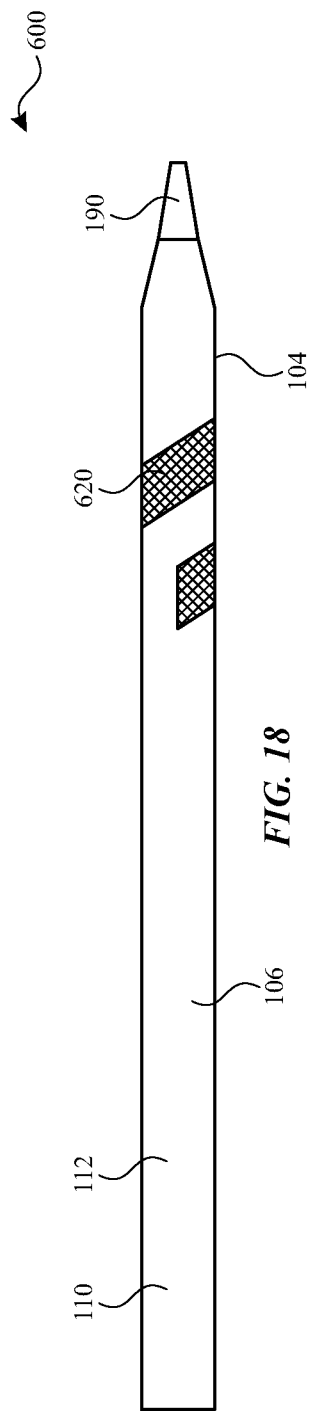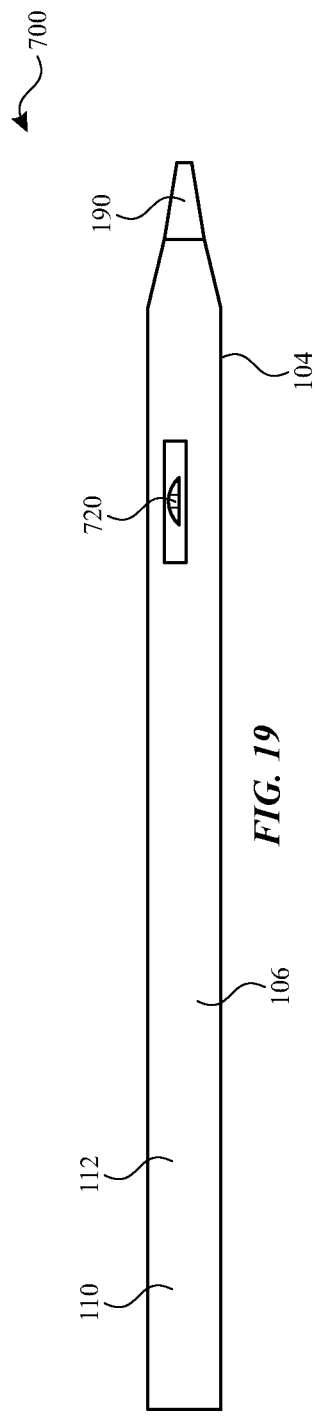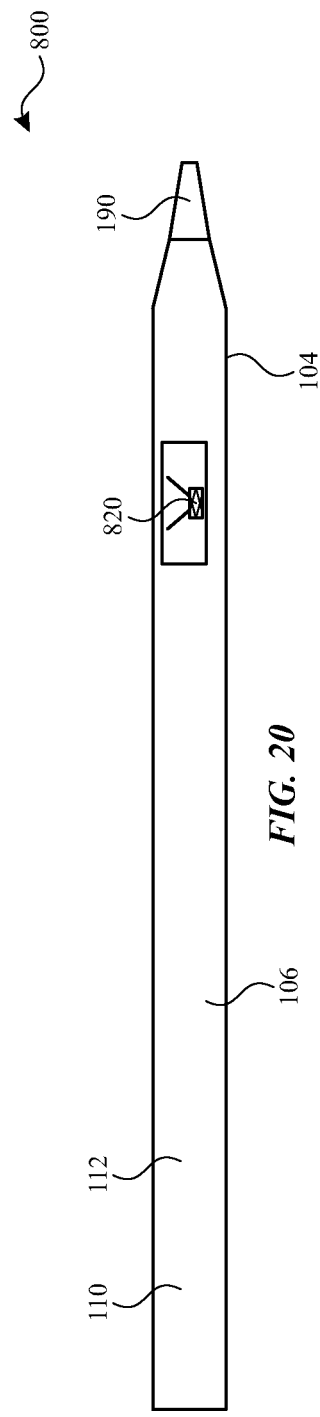

STYLUS WITH COMPRESSIVE FORCE SENSOR

CROSS-REFERENCE TO RELATED APPLICATION

This application claims the benefit of U.S. Provisional Application No. 63/083,786, entitled "STYLUS WITH COMPRESSIVE FORCE SENSOR," filed Sep. 25, 2020, the entirety of which is incorporated herein by reference.

TECHNICAL FIELD

The present description relates generally to input devices, and, more particularly, to an input device that control an external electronic device.

BACKGROUND

A variety of handheld input devices exist for detecting input from a user during use. For example, a stylus can be utilized to provide input by contacting a touch panel of an electronic device. The touch panel may include a touch sensitive surface that, in response to detecting a touch event, generates a signal that can be processed and utilized by other components of the electronic device. A display component of the electronic device may display textual and/or graphical display elements representing selectable virtual buttons or icons, and the touch sensitive surface may allow a user to navigate the content displayed on the display screen. Typically, a user can move one or more input devices, such as a stylus, across the touch panel in a pattern that the device translates into an input command.

BRIEF DESCRIPTION OF THE DRAWINGS

Certain features of the subject technology are set forth in the appended claims. However, for purpose of explanation, several embodiments of the subject technology are set forth in the following figures.

FIG. 18 illustrates a side elevation view of a stylus, in accordance with some embodiments of the present disclosure.

FIG. 19 illustrates a side elevation view of a stylus, in accordance with some embodiments of the present disclosure.

FIG. 20 illustrates a side elevation view of a stylus, in accordance with some embodiments of the present disclosure.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Embodiments described herein provide an input device, such as a stylus that can be used with electronic devices, such as computers, tablet computing devices, and/or gaming devices. The stylus can allow the user to interface with the electronic device across a touch panel in a pattern that the device translates into an input command. The stylus can include one or more sensors to provide additional input capabilities. For example, the stylus can include one or more sensors to detect a squeezing or compressive force against the body of the stylus. The sensors can be capacitance sensors, strain gauges, force resistive sensors, magnetic/inductive sensors, pneumatic sensors, piezo sensors, and/or optical sensors. The sensors can be configured to detect a compressive or squeezing force through an unbroken or continuous outer surface of the stylus, allowing for user comfort.

The additional input provided by detecting squeezing or compressive force can allow the stylus to provide improved usability and on screen/off screen interaction with the electronic device. For example, the squeezing input can provide context sensitive actions, program switching, tool switching, confirmation of actions, etc. The user can squeeze or compress the stylus at a natural grip position or other positions to provide different inputs to the electronic device.

A stylus input device can allow a user to interface with an external electronic device. The stylus can provide an additional or alternative input to the external electronic device in response to a user applying a compressive force to the device housing. The stylus can include multiple sensors to provide a signal in response to the compressive force applied to the stylus.

These and other embodiments are discussed below with reference to FIGS. 1-19. However, those skilled in the art will readily appreciate that the detailed description given herein with respect to these Figures is for explanatory purposes only and should not be construed as limiting.

Figure 1:
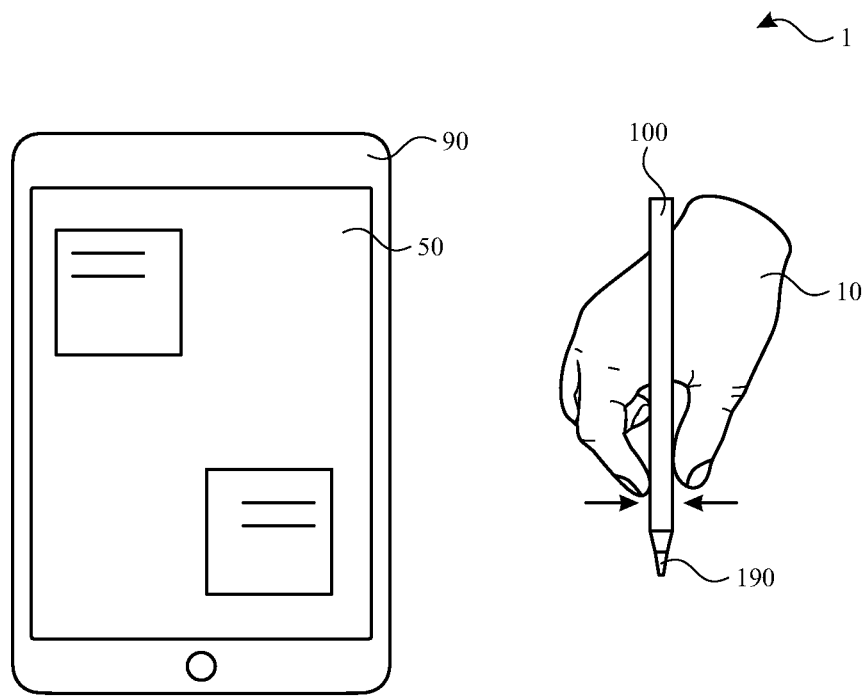
FIG. 1 illustrates a schematic view of a stylus being used with an external electronic device, in accordance with some embodiments of the present disclosure.

For example, FIG. 1 illustrates a system 1 including a stylus 100 and an external device 90 having a surface 50, according to some embodiments of the subject technology. The stylus 100 can be held by a user 10 and operate as a touch-based input device for use with the external device 90. The surface 50 can include a display surface and/or a touch panel for interacting with the stylus 100 when contacted thereby. For example, the stylus 100 can include a tip 190 for contacting the surface 50. Such contact can be detected by the external device 90 and/or the stylus 100. For example, the stylus 100 can include one or more sensors that detect when the tip 190 contacts the surface 50. Such sensors can include one or more contact sensors, capacitance sensors, touch sensors, cameras, piezoelectric sensors, pressure sensors, photodiodes, and/or other sensors operable to detect contact with the surface 50.

As described herein, the user 10 can use alternative input methods, such as squeezing, deflecting, or compressing the stylus 100 to provide an alternative or additional input to the external device 90. In some embodiments, the stylus 100 can receive inputs from the user 10 at a location of the user's grip by the user compressing or squeezing the stylus 100. Optionally, the stylus 100 can receive inputs from the user 10 at another location spaced apart from the user's natural grip of the stylus 100. The stylus 100 can include one or more sensors to detect squeezing, deflecting, or compressing of the stylus 100.

During operation, the squeezing, deflecting, or compressing input received by the stylus 100 can allow the user to control on screen or off screen operations of the external device 90. For example, by squeezing portions of the stylus 100, the external device 90 can provide context sensitive actions, program switching, tool switching, confirmation of actions, etc. In some embodiments, the squeezing, deflecting, or compressing input received by the stylus 100 can be used in conjunction with the position of the stylus 100 and/or the tip 190 relative to the external device 90 to control the operation of the external device 90.

While some embodiments of touch-based input devices disclosed herein relate to styluses, it will be appreciated that the subject technology can encompass and be applied to other input devices. For example, an input device in accordance with embodiments disclosed herein can include a phone, a tablet computing device, a mobile computing device, a watch, a laptop computing device, a mouse, a game controller, a remote control, a digital media player, and/or any other electronic device. Further, the external device can be any device that interacts with a touch-based input device. For example, an external device in accordance with embodiments disclosed herein can include a tablet, a phone, a laptop computing device, a desktop computing device, a wearable device, a mobile computing device, a tablet computing device, a display, a television, a phone, a digital media player, and/or any other electronic device.

Figure 2:
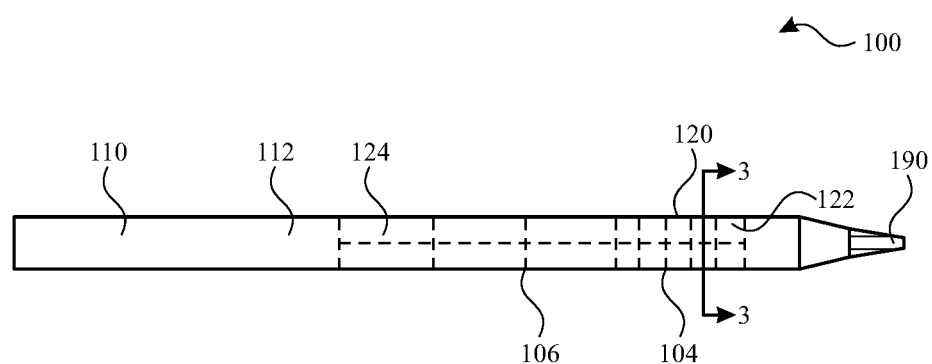
FIG. 2 illustrates a side elevation view of a stylus, in accordance with some embodiments of the present disclosure.

According to some embodiments, for example as illustrated in FIG. 2, the stylus 100 can include a housing 110 that provides an outermost cover along at least a portion of the length of the stylus 100. The housing 110 can have a generally elongate cylindrical or otherwise pen-like shape to allow a user to comfortably grasp the stylus 100. In some embodiments, the housing 110 can define a continuous outer surface 112 along at least a portion of the length of the stylus 100. The continuous outer surface 112 can form an unbroken surface or otherwise a surface free of voids, cavities, or openings. Advantageously, by providing a housing 110 having a continuous outer surface 112, a user more comfortably grasp the stylus 100 and interact with the stylus 100 in a more intuitive or natural manner.

A user can grip the stylus 100 at a user grip region 104 during use of the stylus 100. The user grip region 104 can be located at a natural grip location, so that the user can provide inputs at the same location that is grasped during normal use of the stylus 100. For example, the user grip region 104 can be located an outer surface 112 of the housing 110. The user grip region 104 can be near a first end or the tip 190 of the stylus 100. For example, the location of the user grip region 104 can be a distance from the tip 190 that is less than a half, a third, or a quarter of the total length of the stylus 100. It will be understood that a user grip region can be along any portion(s) of the stylus 100, optionally up and including an entire length of the stylus 100.

According to some embodiments, a marker can be provided on the outer surface 112 as an indicator for the location of the user grip region 104. The marker can be flush with neighboring portions of the outer surface 112, such that it can be seen but provide the same features as other portions of the housing 110. Alternatively or in combination, the marker can provide a protrusion, recess, or texture that provides surface features that are different from adjacent portions of the housing 110.

As can be appreciated, the user can grasp or otherwise interact with other portions of the stylus 100, such as the barrel region 106. The barrel region 106 can be defined as the portion extending from the user grip region 104 toward the second end, opposite to the tip 190 of the stylus 100. In some applications, the user can provide additional inputs by interacting with the barrel region 106. Similar to the user grip region 104, the barrel region 106 can be disposed on the outer surface 112 of the housing 110. The barrel region 106 can be more than a quarter, a third, or a half of the total length of the stylus 100.

As described herein, the stylus 100 can include components to receive input from the user as the user grasps the stylus 100. For example, the stylus 100 can include sensors 120 to receive an input as the user applies compressive force or otherwise squeezes the housing 110. In some embodiments, the sensors 120 can be configured to detect a compressive force applied to the user grip region 104 and/or the barrel region 106. Optionally, the sensors 120 can detect the amount of compressive force the user is applying as a gradient of values.

In some embodiments, the sensors 120 are configured to omnidirectionally detect the compressive force applied to the housing 110. Optionally, the sensors 120 can be configured to detect the positioning of where the user is applying the compressive force along the housing 110, permitting unidirectional detection of the compressive force.

In the depicted example, the sensors 120 can detect a compressive force along various segments 122, 124 of the housing 110 to detect the positioning of the compressive force relative to the stylus 100. The sensors 120 can be coupled to, or otherwise associated with various portions or segments 122, 124 of the housing 110 to discretely detect the compressive force applied to a particular segment 122, 124. During operation, the position of the applied compressive force can be determined by identifying the segments 122, 124 where the user applied the compressive force.

Segments 122, 124 of the housing 110 can be various portions of the continuous outer surface 112 where a compressive force can be discretely detected by the sensors 120. The segments 122, 124 can be any suitable shape and may be interconnected or otherwise adjacent to other segments 122, 124.

In the depicted example, the segments 122, 124 can vary in size and shape. In some embodiments, the segments 122, 124 can vary in longitudinal length and/or circumferential segment length. For example, the segments 122 located in the user grip region 104 can be smaller in size than the segments 124 located in the barrel region 106. Further, various portions of the stylus 100 can include different quantities of segments 122, 124. For example, the user grip region 104 can include a greater number of segments 122 compared to the number of segments 124 included in the barrel region 106. As can be appreciated, areas where a high level of resolution or detail regarding the position of the compressive force is desired can include a higher density of smaller segments 122, 124. A high density of segments 122, 124 may be desired in regions where a user may frequently squeeze or compress the housing 110 to allow the sensors 120 to discern fine differences in the positioning of the compressive force. For example, the user grip region 104 can include a higher density of segments 122 compared to the density of segments 124 within the barrel region 106.

Figure 3:
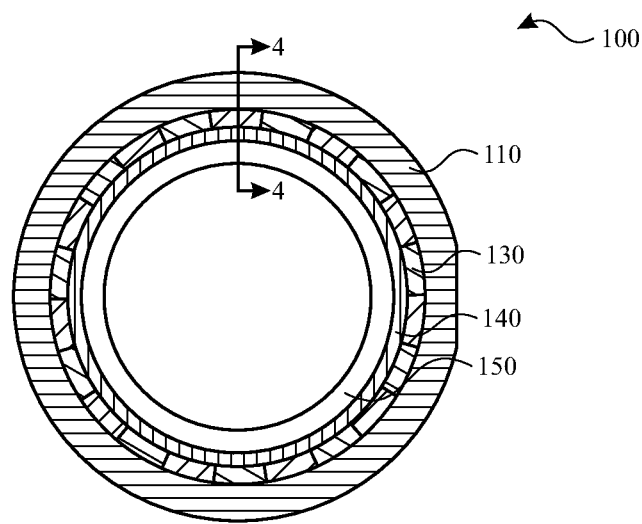
FIG. 3 illustrates a cross-sectional view of the stylus of FIG. 2 along section line 3-3.
Figure 4:
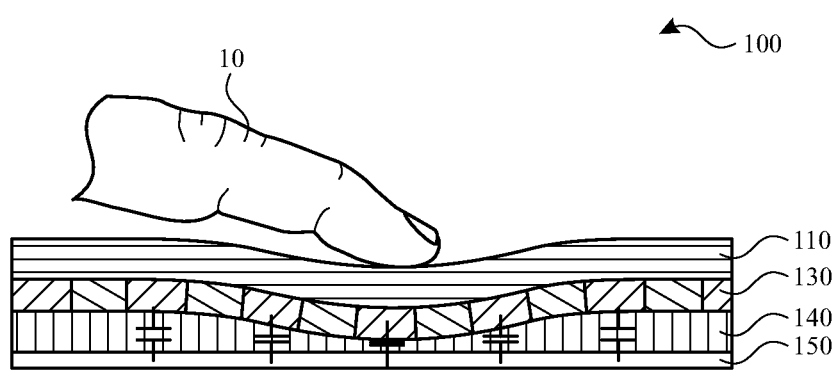
FIG. 4 illustrates a cross-sectional view of the stylus of FIG. 3 along section line 4-4.

With reference to FIGS. 3 and 4, the sensors 120 can utilize capacitive gap sensing to determine the compressive force applied to the housing 110. In the depicted example, the stylus 100 includes one or more capacitance sensors 130 disposed in a capacitance layer along or around the housing 110. Advantageously, the use of capacitance sensors 130 allows for the measurement of compressive force applied to the housing 110 while allowing the continuous outer surface 112 to remain unbroken.

In the depicted example, the capacitance sensor 130 measures the change in capacitance as the housing 110 is deflected relative to a rigid guide tube 150 in response to a compressive force applied to the housing 110. As illustrated, the capacitance sensor 130 is coupled to the housing 110 and disposed between the housing 110 and the guide tube 150. In some embodiments, the capacitance sensor 130 can deflect with the housing 110. During operation, as the housing 110 is deflected toward the guide tube 150 in response to a compressive force, the change in capacitance between the housing 110 and the guide tube 150 can be measured by the capacitance sensor 130. As can be appreciated, the change in capacitance measured by the capacitance sensor 130 can be related to the deflection of the housing 110 and the compressive force applied to the housing 110.

Optionally, the stylus 100 can include compliant material 140 to reduce the deflection of the housing 110 relative to the guide tube 150 in response to a compressive force applied to the housing 110. As illustrated, the compliant material 140 can be disposed between the housing 110 and the guide tube 150. During operation, the compliant material 140 can compress as the housing 110 is deflected, reducing the deflection of the housing 110 in response to a compressive force. Further, the compliant material 140 can resiliently expand after compression to urge the housing 110 toward a natural state. The compliant material 140 can be formed from a resilient foam or a spring member. For example, the compliant material 140 can include a foam of open cells and/or closed cells. It will be understood that open cell foam structures can allow air to pass between different cells, thereby allowing deformation and restoration to a rest shape by the movement of air between cells. In contrast, closed cell foam structures can form cells that are isolated from each other, such that deformation and restoration is achieved without movement of air from one cell to another. It will be further be understood that open cell foams can provide a greater degree of compliance, whereas closed cell foams can provided a greater degree of resilience. Other structures can similarly be provided with pockets of air, such as materials that are extruded to form pockets, tubes, or other chambers containing air. As can be appreciated, the thickness and materials of the housing 110 and/or the compliant material 140 can be adjusted for an expected range of compressive forces and/or a desired range of deflection of the housing 110.

In the depicted example, the stylus 100 can include multiple capacitance sensors 130 disposed in a capacitance sensor layer to detect a compressive force applied to various segments 122, 124 of the housing 110 to detect the position of the compressive force relative to the stylus 100. The capacitance sensors 130 can be coupled to, or otherwise associated with various portions or segments 122, 124 of the housing 110 to discretely detect the compressive force applied to a particular segment 122, 124.

In the depicted example, a capacitance sensor 130 can be coupled to a segment 122, 124 of the housing 110 between the housing 110 and the guide tube 150, such that the capacitance sensor 130 deflects with the respective segment 122, 124. During operation, as a segment 122, 124 is deflected toward the guide tube 150 in response to a compressive force, the change in capacitance between the segment 122, 124 and the guide tube 150 can be measured by the capacitance sensor 130. As can be appreciated, the change in capacitance measured by the capacitance sensor 130 can be related to the deflection of the segment 122, 124 and the compressive force applied to the segment 122, 124. Accordingly, the position of the applied compressive force can be determined by identifying the segments 122, 124 where the user applied the compressive force.

Figure 5:
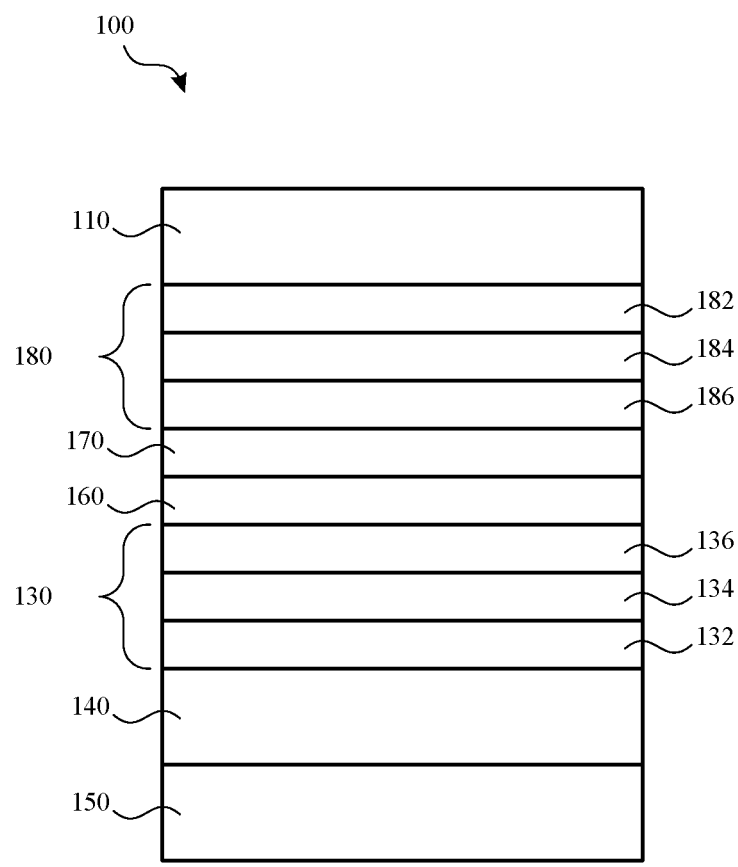
FIG. 5 illustrates a cross-sectional view of the stylus of FIG. 2 along section line 3-3.

Additionally or alternatively, a stylus can include both a capacitance sensor for touch inputs and a capacitance sensor for compressive force (e.g., squeeze) inputs. As shown in FIG. 5, the stylus can include a touch input sensor 180, which can be used to detect a tap and/or sliding gesture by the user. For example, as a user applies a finger at the housing 110, the stylus 100 can detect the resulting capacitance that is induced in the touch input sensor 180. The user can subsequently lift the finger, and the stylus 100 can detect the resulting capacitance or change in capacitance that is induced in the touch input sensor 180. The user can subsequently return the finger to the grip region 104, and the stylus 100 can detect the resulting capacitance or change in capacitance that is induced in the touch input sensor 180. The sequence of inputs within a span of time can be interpreted by the stylus 100 as a user's tap gesture. Multiple touch input sensing elements of the touch input sensor 180 along the stylus 100 can be used in concert to detect sliding gestures. For example, as a user applies a finger at a first part of the grip region, the touch input sensor 180 of the stylus 100 can detect the resulting capacitance that is induced in a corresponding first touch input sensing element of the touch input sensor 180. The user can subsequently move the finger to a second part of the housing 110, and the touch input sensor 180 of the stylus 100 can detect the resulting capacitance that is induced in the corresponding second touch input sensing element of the touch input sensor 180.

As shown in FIG. 5, touch input sensor 180 can be positioned about the capacitance sensor 130, which can be used to detect squeezing, deflecting, and/or compressing of the stylus 100 as described herein with respect to FIGS. 3 and 4. The touch input sensor 180 can be positioned radially between a guide tube 150 and the housing 110 of the stylus 100. The capacitance sensor 130 can also be positioned radially between a guide tube 150 and the housing 110 of the stylus 100. In particular, the capacitance sensor 130 can be positioned radially between the touch input sensor 180 and the guide tube 150, and the touch input sensor 180 can be positioned radially between the capacitance sensor 130 and the housing 110.

As further shown in FIG. 5, the touch input sensor 180 can include one or more touch input sensing elements 184. The touch input sensing elements 184 can include a metal (e.g., copper) or another conductive material. The one or more touch input sensing elements 184 can be surrounded on either radial side by a coverlay 182 and/or an insulating layer 186 (e.g., polyimide or other polymer). The one or more touch input sensing elements 184 can be connected to a routing layer 170 (e.g., with vias extending through the insulating layer 186) to operably connect the touch input sensing elements 184 to a controller.

As further shown in FIG. 5, the capacitance sensor 130 can include one or more force input sensing elements 134. The force input sensing elements 134 can include a metal (e.g., copper) or another conductive material. The one or more force input sensing elements 134 can be surrounded on either radial side by a coverlay 132 and/or an insulating layer 136 (e.g., polyimide or other polymer). The capacitance sensor 130 can be coupled to the routing layer 170 and/or the touch input sensor 180 with an adhesive 160.

Figure 6:
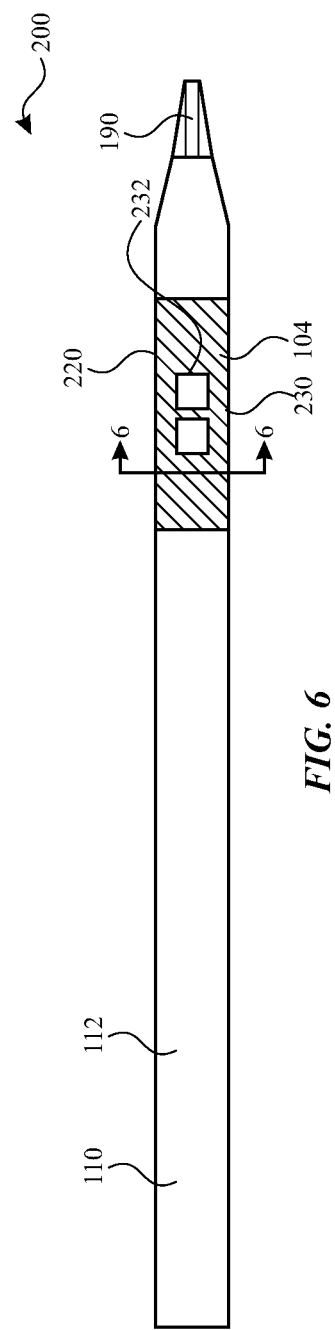
FIG. 6 illustrates a side elevation view of a stylus, in accordance with some embodiments of the present disclosure.
Figure 7:
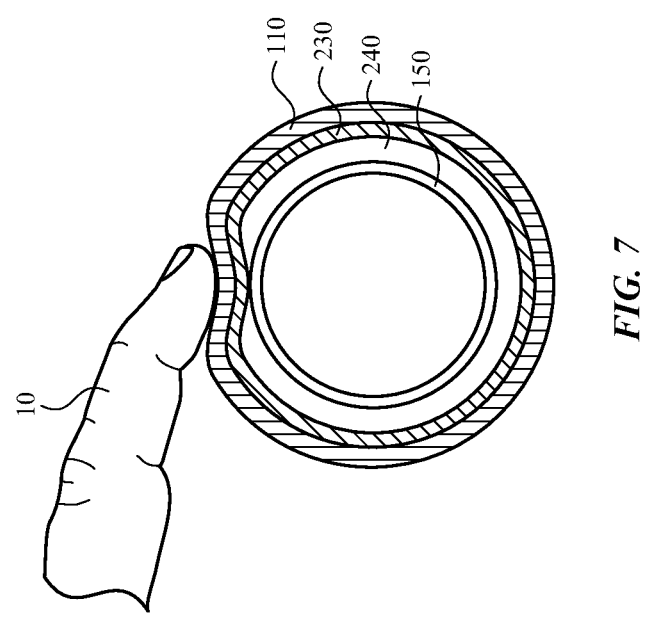
FIG. 7 illustrates a cross-sectional view of the stylus of FIG. 6 along section line 6-6.

With reference to FIGS. 6 and 7, the stylus 200 can utilize strain sensors 220 to determine the compressive force applied to the housing 110. As illustrated, the stylus 200 includes one or more strain gauges 232 disposed along or around the housing 110.

In the depicted example, the strain gauges 232 provide a signal in response to the deflection of the housing 110 caused by a compressive force applied to the housing 110. The strain gauges 232 can be disposed or otherwise associated with various portions of the housing 110. For example, the strain gauges 232 can be associated with the user grip region 104 and/or the barrel region 106 of the housing 110. In some embodiments, the strain gauges 232 are disposed on or otherwise attached to a sensor substrate 230 that is coupled to the housing 110. The sensor substrate 230 is disposed between the housing 110 and the guide tube 150. Optionally, the strain gauges 232 and/or the sensor substrate 230 can be coupled to the guide tube 150.

In the depicted example, the sensor substrate 230 can deflect with the housing 110. The stylus 200 can include an air gap 240 between the sensor substrate 230 and the guide tube 150 to allow the housing 110 and the sensor substrate 230 to deflect inward. Therefore, during operation, as the housing 110 is deflected by a compressive force exerted by the user 10, the deflection of the sensor substrate 230 is measured by the strain gauges 232. As can be appreciated, the deflection of the sensor substrate 230 can be related to the deflection of the housing 110 and the compressive force applied to the housing 110. Optionally, the sensor substrate 230 can deflect with the guide tube 150 to detect the deflection of the guide tube 150.

As illustrated, the stylus 200 include multiple strain gauges 232 coupled to the sensor substrate 230 arranged in a strain gauge array. Advantageously, the use of multiple strain gauges 232 in a strain gauge array can increase the signal to noise ratio of the strain signal and reject thermal effects that may reduce accuracy of the force measurements. The strain gauges 232 can be arranged in a bridge arrangement, such as a full bridge arrangement, a half bridge arrangement, and/or a quarter bridge arrangement.

Figure 8:
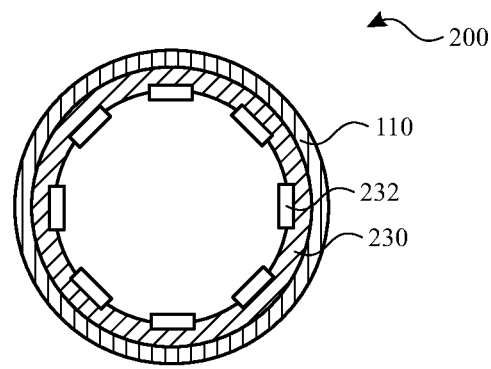
FIG. 8 illustrates a cross-sectional view of a stylus, in accordance with some embodiments of the present disclosure.

With reference to FIG. 8, in some embodiments, the strain gauges 232 can be disposed circumferentially about the housing 110. As illustrated, the strain gauges 232 can disposed circumferentially about the sensor substrate 230 coupled to the housing 110. Optionally, the strain gauges 232 are arranged around the inner diameter or surface of the sensor substrate 230. Advantageously, by disposing strain gauges 232 circumferentially about the housing 110 and/or the sensor substrate 230, the stylus 200 can receive unidirectional compressive force inputs.

Figure 9:
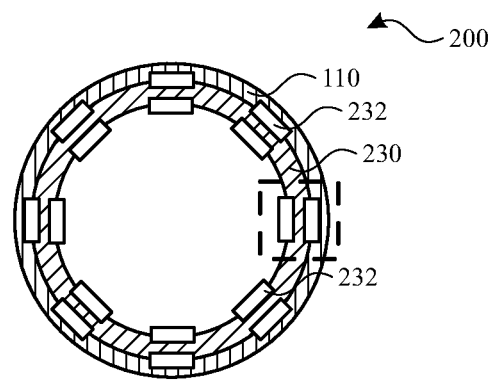
FIG. 9 illustrates a cross-sectional view of a stylus, in accordance with some embodiments of the present disclosure.

With reference to FIG. 9, the strain gauges 232 can be disposed along on outer diameter or surface of the sensor substrate 230. In some embodiments, the strain gauges 232 are disposed along the inner diameter or surface of the housing 110. As illustrated, the strain gauges 232 are disposed between the outer surface of the sensor substrate 230 and the inner surface of the housing 110.

Further, in some embodiments, the stylus 200 can include strain gauges 232 that are also disposed or arranged around the inner diameter or surface of the sensor substrate 230. The strain gauges 232 disposed on the outer surface of the sensor substrate 230 can be radially aligned or otherwise opposite to the strain gauges 232 that are disposed on the inner surface of the sensor substrate 230. Advantageously, the use of complimentary or radially-aligned strain gauges 232 can allow the stylus 200 to reject temperature effects and to increase the useful signal provided by the strain gauges 232.

Figure 10:
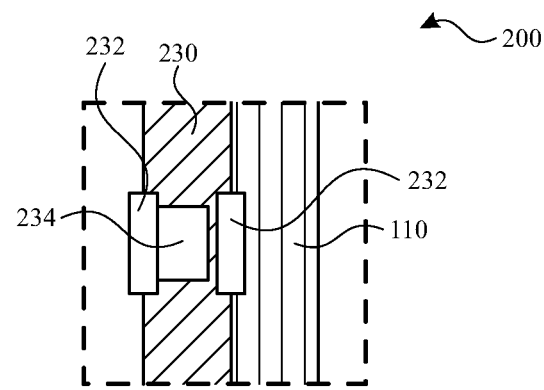
FIG. 10 illustrates a detail of the cross-sectional view of the stylus of FIG. 9.

With reference to FIGS. 9 and 10, the sensor substrate 230 can include strain-amplifying features 234 to increase the useful signal provided by the strain gauges 232. In the depicted example, the strain-amplifying features 234 can increase the amount of deflection of the sensor substrate 230 to allow the strain gauges 232 to provide a stronger signal for a given deflection or compressive force.

As illustrated, the strain-amplifying features 234 are areas of the sensor substrate 230 with reduced material or radial thickness. Accordingly, the areas of the sensor substrate 230 near or adjacent to the strain-amplifying features 234 can have a lower local modulus or higher deflection in response to a compressive force compared to other areas of the sensor substrate 230. As shown, the strain-amplifying features 234 can be disposed adjacent to strain gauges 232, amplifying the deflection or strain detected by the strain gauges 232 and increasing the signal provided by the strain gauges 232.

Figure 11:
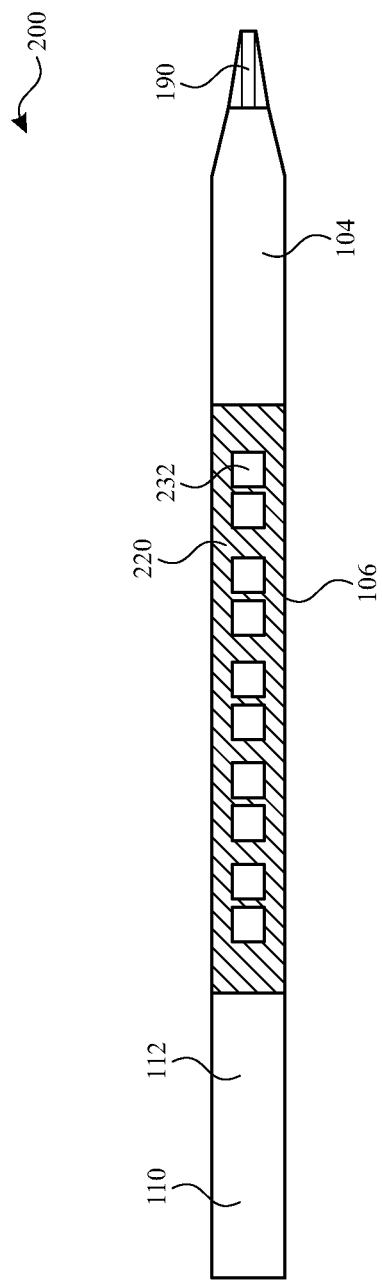
FIG. 11 illustrates a side elevation view of a stylus, in accordance with some embodiments of the present disclosure.

With reference to FIG. 11, the strain gauges 232 can be disposed or otherwise associated with various portions of the housing 110. As illustrated, strain gauges 232 can extend along the length of the housing 110. In some embodiments, the strain gauges 232 can be disposed along the length of the barrel region 106.

Optionally, the stylus 200 can include multiple strain gauges 232 arranged in multiple arrays to detect strain or deflection along the length of the housing 110 or portions of the housing 110. The arrays of strain gauges 232 can be a bridge arrangement, such as a full bridge arrangement, a half bridge arrangement, and/or a quarter bridge arrangement. As can be appreciated, different groups or arrays of strain gauges 232 can be arranged in different arrangements.

Figure 12:
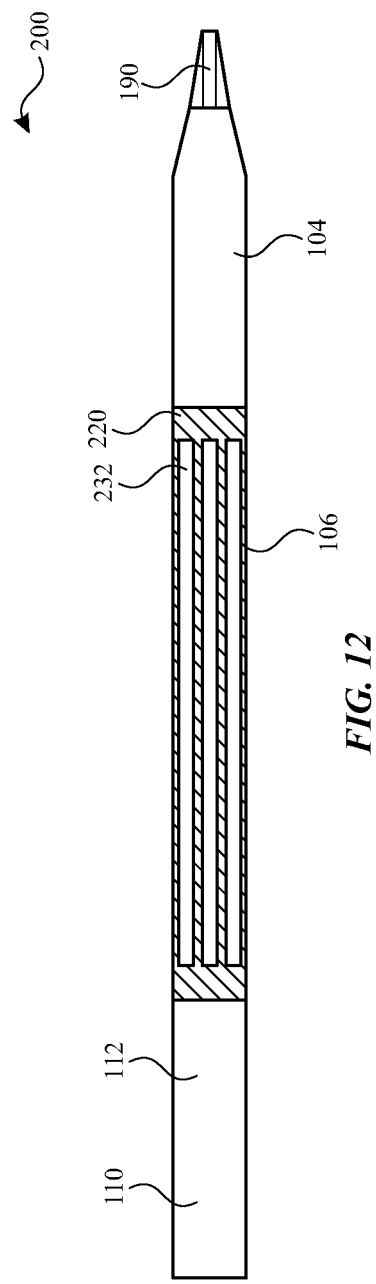
FIG. 12 illustrates a side elevation view of a stylus, in accordance with some embodiments of the present disclosure.

With reference to FIG. 12, the stylus 200 can include strain gauges 232 that are formed as elongate strips. The elongate strain gauges 232 can extend along the length of the housing 110, or portions of the housing 110, such as the length of the barrel region 106 and/or the user grip region 104.

Figure 13:
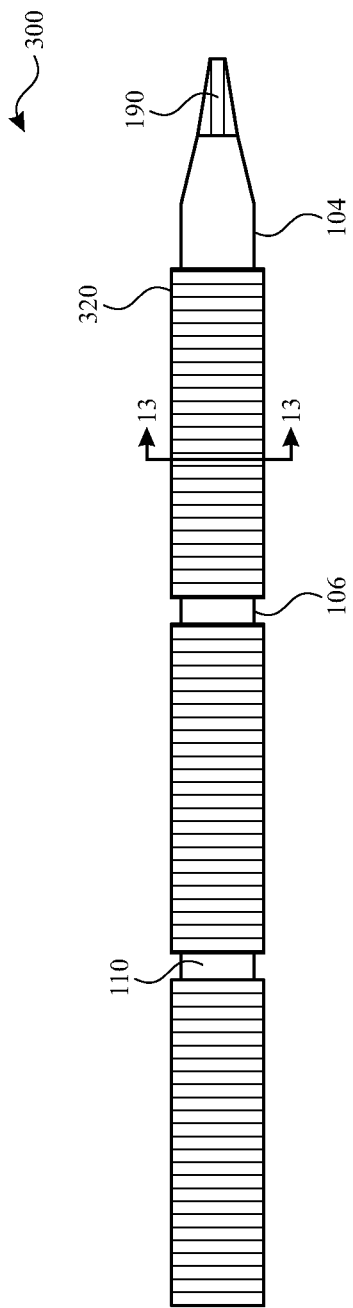
FIG. 13 illustrates a side elevation view of a stylus, in accordance with some embodiments of the present disclosure.
Figure 14:
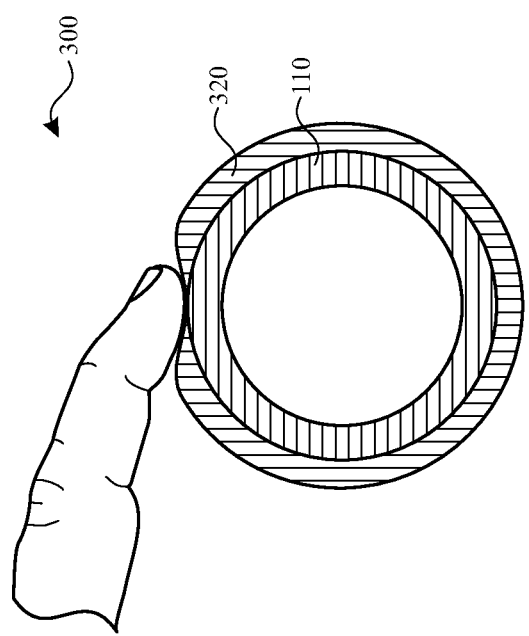
FIG. 14 illustrates a cross-sectional view of the stylus of FIG. 13 along section line 13-13.

With reference to FIGS. 13 and 14, the stylus 300 can utilize resistance measurements to determine the compressive force applied to the housing 110. In the depicted example, the stylus 300 includes one or more force-sensitive resistors 320 disposed around an outer or exterior surface of the housing 110. Advantageously, the use of force-sensitive resistors 320 allows for the measurement of compressive force applied to the housing 110 while also providing a conforming surface for the user to grasp.

In the depicted example, the force-sensitive resistor 320 provides a varying and proportional resistance value as the user applies a compressive force to the force-sensitive resistor 320 and the housing 110. As illustrated, the force-sensitive resistor 320 is coupled to an outer surface of the housing 110. In some embodiments, the force-sensitive resistor 320 deflects in response to a compressive force. During operation, as the force-sensitive resistor 320 is deflected by a compressive force exerted by the user, the resistance value of the force-sensitive resistor 320 changes. As can be appreciated, the resistance value provided by the force-sensitive resistor 320 can be related to the compressive force applied to the force-sensitive resistor 320.

In some embodiments, the stylus 300 can include an elongated force-sensitive resistor 320 strip disposed along the surface to detect a compressive force applied to various portions of the housing 110. As illustrated, the stylus 300 can include multiple force-sensitive resistors 320 disposed along the surface to detect the axial position of the compressive force relative to the stylus 300. Each force-sensitive resistor 320 can extend for a portion of the length of the housing 110 (e.g. user grip region 104 and/or barrel region 106) to allow the stylus to discretely detect the compressive force applied to a particular portion of the housing 110.

In addition to providing compressive force input to the stylus 300, the force-sensitive resistors 320 can provide a conforming surface for the user to grasp. In the depicted example, the force-sensitive resistors 320 can be formed from a material that has a lower modulus than the material of the housing 110. Optionally, the force-sensitive resistors 320 can be formed from silicon. Advantageously, the conforming surface of the force-sensitive resistors 320 can be utilized in a gripping surface, for example in the user grip region 104 to reduce user fatigue and increase user comfort. Further, the force-sensitive resistors 320 can provide a visual indication of various portions of the stylus 300, such as the user grip region 104.

Figure 15:
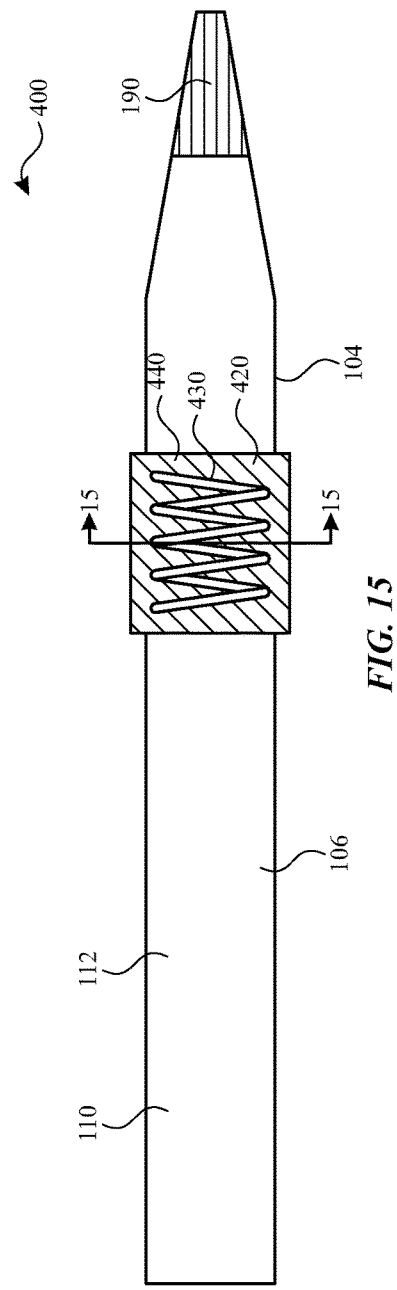
FIG. 15 illustrates a side elevation view of a stylus, in accordance with some embodiments of the present disclosure.
Figure 16:
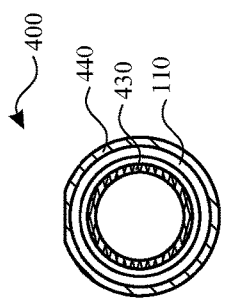
FIG. 16 illustrates a cross-sectional view of the stylus of FIG. 13 along section line 14-14.

With reference to FIGS. 15 and 16, the stylus 400 can utilize inductive sensing to determine the compressive force applied to the housing 110. In the depicted example, the stylus 400 includes one or more inductive sensors 420 disposed along the housing 110.

In the depicted example, the inductive sensor 420 measures the change in inductance as the ferrite lining 440 is deflected relative to a coil 430 in response to a compressive force applied to the housing 110. As illustrated, the ferrite lining 440 is coupled to the housing 110. The ferrite lining 440 can be disposed on the outer surface of the housing 110 or the inner surface of the housing 110. Optionally, the ferrite lining 440 can be integrated into the housing 110. In some embodiments, the ferrite lining 440 deflects with the housing 110. During operation, as the housing 110 and the ferrite lining 440 is deflected in response to a compressive force, the change in inductance between the ferrite lining 440 and the coil 430 can be measured. As can be appreciated, the change in inductance measured by the coil 430 can be related to the deflection of the housing 110 and the compressive force applied to the housing.

Figure 17:
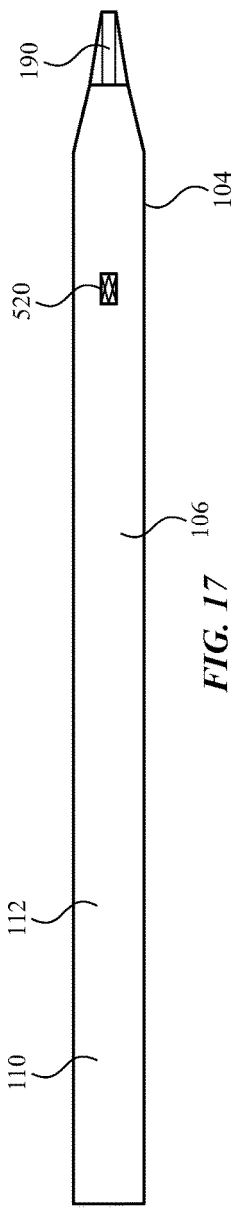
FIG. 17 illustrates a side elevation view of a stylus, in accordance with some embodiments of the present disclosure.

With reference to FIG. 17, the stylus 500 can sense changes in air pressure to determine the compressive force applied to the housing 110. In the depicted example, the stylus 500 includes one or more pneumatic sensors 520 disposed along the housing.

In the depicted example, the pneumatic sensor 520 measures the rate of air pressure change within the housing 110 as the housing 110 is deflected in response to a compressive force applied to the housing. The rate of air pressure change can be related to the deflection of the housing 110 and the compressive force applied to the housing 110.

With reference to FIG. 18, the stylus 600 can utilize piezo sensors 620 to determine the compressive force applied to the housing 110. As illustrated, the stylus 600 can include one or more piezo sensors 620 disposed along or around the housing.

In the depicted example, the piezo sensors 620 provide a signal in response to the deflection of the housing 110 caused by a compressive force applied to the housing 110. The piezo sensors 620 can be disposed or otherwise associated with various portions of the housing 110. For example, the piezo sensors 620 can be associated with the user grip region 104 and/or the barrel region 106 of the housing 110. Optionally, the piezo sensors 620 can be formed from a flexible material to allow the piezo sensors 620 to be wrapped around a portion of the housing 110. In some embodiments, the piezo sensors 620 are formed from poly-L-lactic acid (PLLA) or polymer thick film (PTF) piezoelectric materials.

In the depicted example, the piezo sensor 620 can deflect with the housing 110. Therefore, during operation, as the housing 110 is deflected by a compressive force exerted by the user, the piezo sensor 620 provides a signal corresponding to the deflection of the housing 110.

With reference to FIG. 19, the stylus 700 can utilize a mechanical switch to determine the compressive force applied to the housing 110. In the depicted example, the stylus 700 includes one or more force-sensitive switches 720 disposed along the housing.

In the depicted example, the force-sensitive switch 720 can be actuated by the deflection of the housing 110 as the housing 110 is deflected in response to a compressive force applied to the housing 110. The deflection of the force-sensitive switch 720 can be related to the deflection of the housing 110 and the compressive force applied to the housing 110.

With reference to FIG. 20, the stylus 800 can visually detect the deflection of the housing 110 to determine the compressive force applied to the housing 110. In the depicted example, the stylus 800 includes one or more optical sensors 820 disposed within the housing 110.

In the depicted example, the optical sensor 820 can measure the deflection of the housing 110 as the housing 110 is deflected in response to a compressive force applied to the housing 110. The deflection of the housing 110 can be related to the compressive force applied to the housing 110.

The stylus can be provided with components that facilitate the operation thereof, including use with an external device. According to some embodiments, the stylus can include a controller and a non-transitory storage media. The non-transitory storage media can include, for example, a magnetic storage medium, optical storage medium, magneto-optical storage medium, read-only memory, random access memory, erasable programmable memory, flash memory, or combinations thereof. According to some embodiments, the controller can execute one or more instructions stored in the non-transitory storage medium to perform one or more functions. For example, the non-transitory storage medium can store one or more measurement or signal to determine the compressive force applied to the stylus.

According to some embodiments, the stylus can include a communication component for communicating with the external device and/or another device. The communication component can include one or more wired or wireless components, WiFi components, near field communication components, Bluetooth components, and/or other communication components. The communication component can include one or more transmission elements, such as one or more antennas. Alternatively or in combination, the communication component can include an interface for a wired connection to the external device and/or another device.

According to some embodiments, the stylus can include a power source, such as one or more batteries and/or power management units. The 100 can include components for charging the power source.

According to some embodiments, the stylus can include other components including, for example, orientation detectors, gyroscopes, accelerometers, biometric readers, displays, sensors, switches (e.g., dome switches), buttons, voice coils, and/or other components.

Accordingly, embodiments of the present disclosure provide a stylus input device can allow a user to interface with an external electronic device. The stylus can provide an additional or alternative input to the external electronic device in response to a user applying a compressive force to the device housing. The stylus can include multiple sensors to provide a signal in response to the compressive force applied to the stylus. Various examples of aspects of the disclosure are described below as clauses for convenience. These are provided as examples, and do not limit the subject technology.

Clause A: a stylus comprising: an elongate device housing defining a first end and a second end, and having a continuous outer surface extending between the first end and the second end, wherein the first end is configured to contact an external electronic device; and multiple sensors coupled to the device housing between the first and second end, wherein each sensor is configured to detect a compressive force applied to a respective segment of the continuous outer surface to provide a signal in response to the compressive force applied to the respective segment of the continuous outer surface, and at least two sensors are configured to detect the compressive force applied to segments of the continuous outer surface of different sizes.

Clause B: a stylus comprising: an elongate device housing defining a first end and a second end, and having a continuous outer surface extending between the first end and the second end, wherein the continuous outer surface is configured to deflect in response to a compressive force and the first end is configured to contact an external electronic device; and an array of strain sensors coupled to the device housing between the first and second end, wherein the array of strain sensors is configured to provide a signal to the external electronic device in response to deflection of the continuous outer surface.

Clause C: a stylus comprising: an elongate device housing comprising an exterior portion and defining a first end and a second end, wherein the first end is configured to contact an external electronic device; and a force sensitive resistor disposed circumferentially around the exterior portion of the device housing, wherein the force sensitive resistor is configured to provide a signal to the external electronic device in response to a compressive force applied to the force sensitive resistor.

One or more of the above clauses can include one or more of the features described below. It is noted that any of the following clauses may be combined in any combination with each other, and placed into a respective independent clause, e.g., clause A, B, or C.

Clause 1: the continuous outer surface comprises a first segment disposed adjacent to the first end and a second segment disposed adjacent to the second end, wherein the second segment is larger than the first segment.

Clause 2: further including a guide tube disposed within the device housing, wherein each sensor is configured to provide the signal in response to the respective segment of the continuous outer surface deflecting relative to the guide tube.

Clause 3: the sensors are configured to deflect with the continuous outer surface.

Clause 4: the sensors comprise multiple capacitance sensors and each capacitance sensor is configured to provide a capacitance signal in response to the respective segment of the continuous outer surface deflecting relative to the guide tube.

Clause 5: further including a compliant material disposed between the guide tube and the device housing.

Clause 6: the compliant material comprises foam or a metal spring.

Clause 7: further including a sensor substrate disposed within the device housing, wherein the array of strain sensors are coupled to the sensor substrate.

Clause 8: the array of strain sensors are disposed on an inner surface of the sensor substrate.

Clause 9: at least a portion of the array of strain sensors are disposed between an outer surface of the sensor substrate and the device housing.

Clause 10: the array of strain sensors are disposed circumferentially about the sensor substrate.

Clause 11: the array of strain sensors are disposed in a bridge arrangement.

Clause 12: the array of strain sensors are disposed in a strip extending between the first end and the second end.

Clause 13: further including a guide tube disposed within the device housing, wherein the array of strain sensors are coupled to the guide tube.

Clause 14: the force sensitive resistor extends between the first end and the second end of the device housing.

Clause 15: the force sensitive resistor comprises a strip that extends between the first end and the second end of the device housing.

Clause 16: further including a second force sensitive resistor disposed along the exterior portion of the device housing.

Clause 17: the force sensitive resistor has a modulus lower than the device housing.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A stylus comprising:
    an elongate device housing defining a first end and a second end, and having a continuous outer surface extending between the first end and the second end, wherein the first end is configured to contact an external electronic device; and
    multiple sensors, including first sensors and second sensors, coupled to the device housing between the first and second end, wherein each of the first sensors and second sensors is configured to detect a compressive force applied to a respective one of first segments and second segments of the continuous outer surface to provide a signal in response to the compressive force applied to the respective one of first segments and second segments, wherein the first segments are of a different size than the second segments, and a density of the first segments along the continuous outer surface is higher than a density of the second segments.

2. The stylus of claim 1, wherein the continuous outer surface comprises a first segment disposed adjacent to the first end and a second segment disposed adjacent to the second end, wherein the second segment is larger than the first segment.

3. The stylus of claim 1, further comprising:
a guide tube disposed within the device housing, wherein each sensor is configured to provide the signal in response to the respective segment of the continuous outer surface deflecting relative to the guide tube.

4. The stylus of claim 3, wherein the sensors are configured to deflect with the continuous outer surface.

5. The stylus of claim 3, wherein the sensors comprise multiple capacitance sensors and each capacitance sensor is configured to provide a capacitance signal in response to the respective segment of the continuous outer surface deflecting relative to the guide tube.

6. The stylus of claim 3, further comprising a compliant material disposed between the guide tube and the device housing.

7. The stylus of claim 6, wherein the compliant material comprises foam or a metal spring.

8. A stylus, comprising:
an elongate device housing defining a first end and a second end, and having a continuous outer surface extending between the first end and the second end, wherein the continuous outer surface is configured to deflect in response to a compressive force and the first end is configured to contact an external electronic device;
an array of strain sensors coupled to the device housing between the first and second end, wherein the array of strain sensors is configured to provide a signal to the external electronic device in response to deflection of the continuous outer surface;
a sensor substrate disposed within the device housing, wherein pairs of the strain sensors are disposed, respectively, on inner and outer surfaces of the sensor substrate.

9. The stylus of claim 8, wherein at least some of the array of strain sensors are disposed circumferentially about the sensor substrate.

10. The stylus of claim 8, wherein the array of strain sensors are disposed in a bridge arrangement.

11. The stylus of claim 8, wherein the array of strain sensors are disposed in a strip extending between the first end and the second end.

12. The stylus of claim 8, further comprising:
a guide tube disposed within the device housing, wherein the array of strain sensors are coupled to the guide tube.

13. The stylus of claim 8, further comprising strain-amplifying features disposed within the sensor substrate, each of the strain-amplifying features being positioned between a corresponding one of the pairs of the strain sensors.

* * * * *